(12) United States Patent
O'Brian et al.

(10) Patent No.: US 7,111,891 B2
(45) Date of Patent: Sep. 26, 2006

(54) TARP COVERING SYSTEM

(76) Inventors: Woody V. O'Brian, 3416 Queensferry Dr. NW., Wilson, NC (US) 27896; Sean Vincent O'Brian, 1007 Tarheel Rd. S., Wilson, NC (US) 27893

( * ) Notice: Subject to any disclaimer, the term of this patent is extended or adjusted under 35 U.S.C. 154(b) by 0 days.

(21) Appl. No.: 11/160,888

(22) Filed: Jul. 14, 2005

(65) Prior Publication Data

US 2005/0242612 A1 Nov. 3, 2005

Related U.S. Application Data

(63) Continuation-in-part of application No. PCT/US04/06594, filed on Mar. 5, 2004.

(60) Provisional application No. 60/452,412, filed on Mar. 6, 2003, provisional application No. 60/532,990, filed on Dec. 29, 2003.

(51) Int. Cl.
*B60J 11/00* (2006.01)

(52) U.S. Cl. ............... 296/98; 296/100.1; 296/100.14

(58) Field of Classification Search ............ 296/98, 296/100.1, 100.11, 100.14
See application file for complete search history.

(56) References Cited

U.S. PATENT DOCUMENTS

| 4,313,367 | A | 2/1982 | Weyer | 92/33 |
| 4,516,802 | A | 5/1985 | Compton | 296/98 |
| 4,874,196 | A | 10/1989 | Goldstein et al. | 296/98 |
| 5,031,955 | A | 7/1991 | Searfoss | 296/98 |
| 5,058,956 | A | 10/1991 | Godwin, Sr. | 296/23 |
| 5,129,698 | A | 7/1992 | Cohrs et al. | 296/98 |
| 5,829,818 | A | 11/1998 | O'Daniel | 296/98 |
| 6,318,790 | B1 | 11/2001 | Henning | 296/98 |
| 6,464,283 | B1 | 10/2002 | Haddad, Jr. | 296/98 |
| 6,474,718 | B1 | 11/2002 | Henning | 296/98 |

FOREIGN PATENT DOCUMENTS

EP 0 581 512 A1 2/1994

*Primary Examiner*—Lori L. Coletta
(74) *Attorney, Agent, or Firm*—Mills Law Firm PLLC

(57) ABSTRACT

A tarp covering system for an open top container of a vehicle includes a pair arms assemblies stowed beneath the base of the container during travel and extendable and pivotal in a semi circular path for covering and uncovering the container.

4 Claims, 19 Drawing Sheets

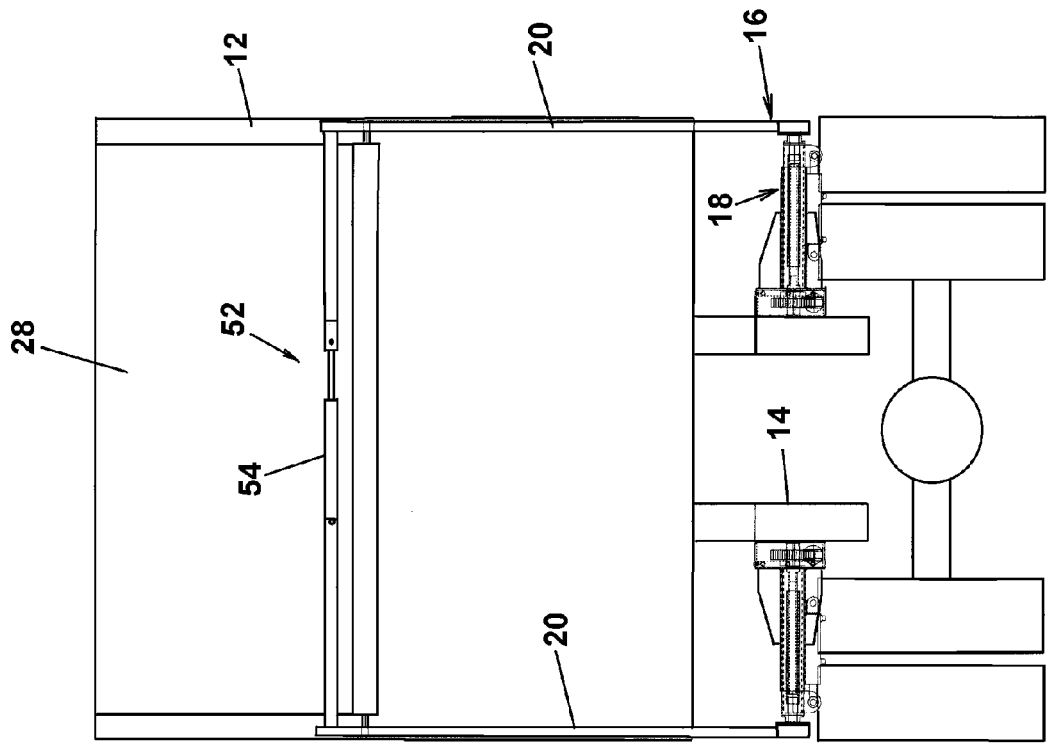
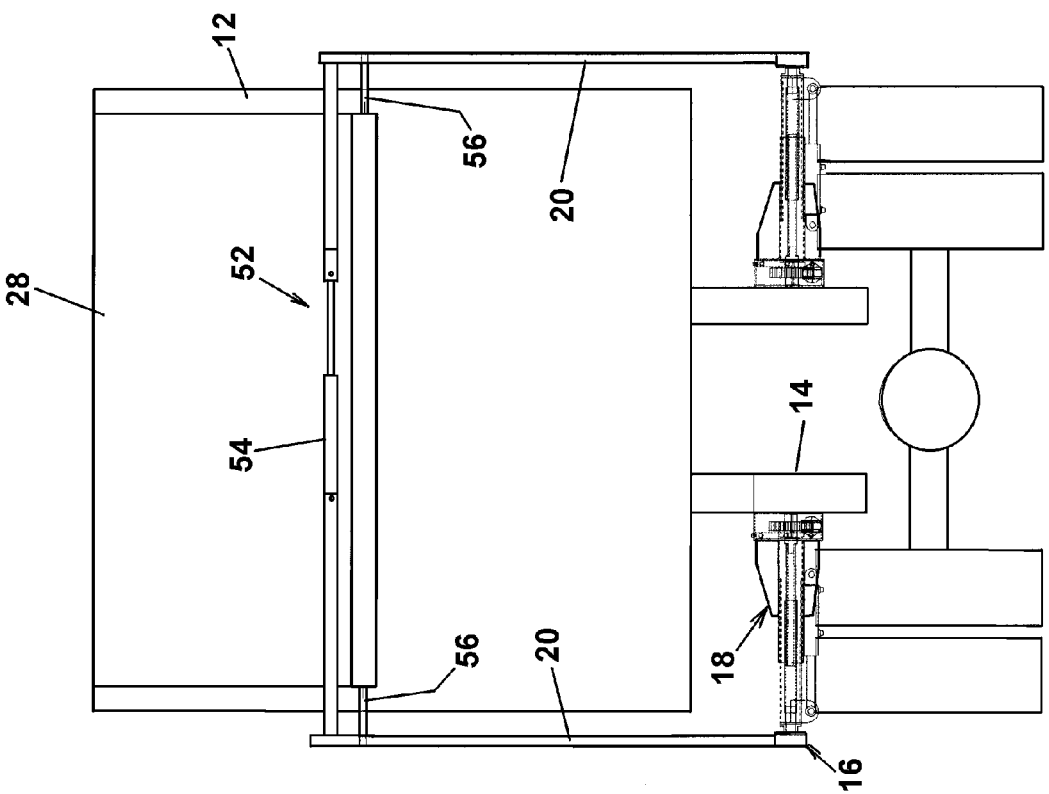

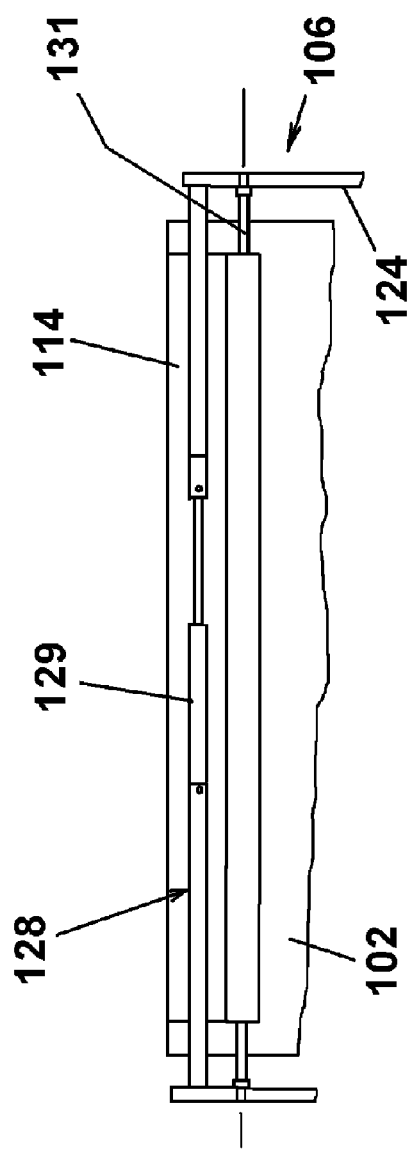
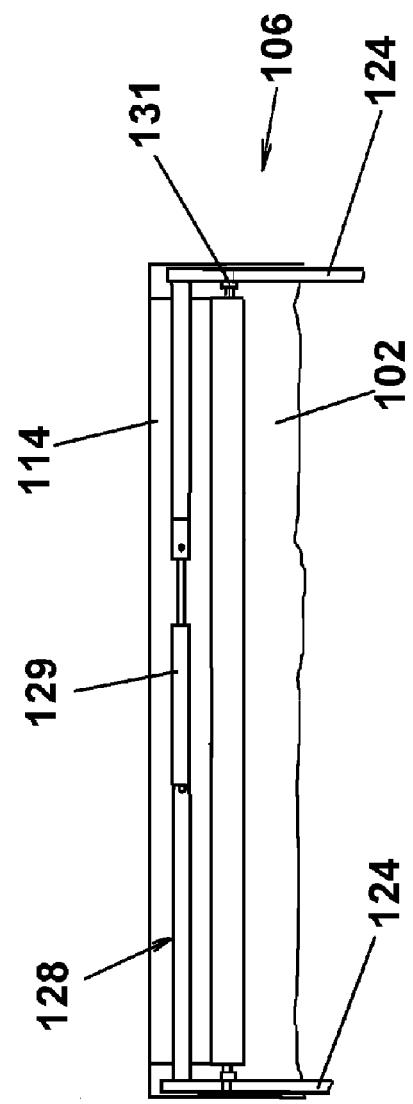

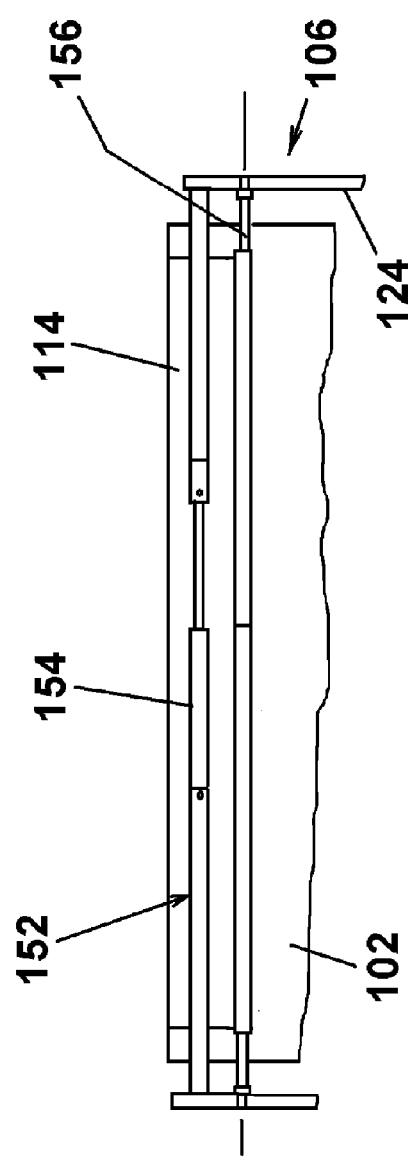
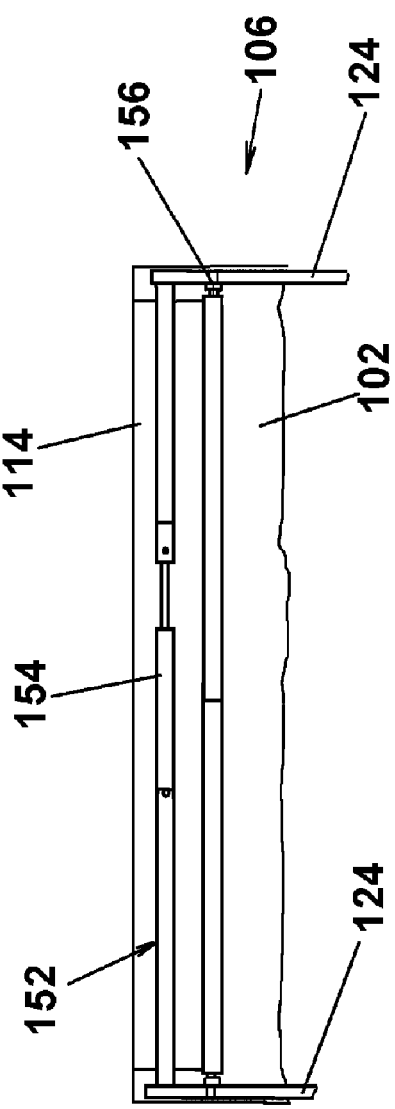
FIG. 20
FIG. 21

TARP COVERING SYSTEM

RELATED APPLICATIONS

This application is a continuation-in-part of PCT International Application No. PCT/US2004/006594, filed Mar. 5, 2004, entitled "Tarp Covering System" which claims the benefits of prior filed copending U.S. Provisional Application Nos. 60/454,412, filed on Mar. 6, 2003, and 60/532,990, filed on Dec. 29, 2003, both entitled "Tarp Covering System".

FIELD OF THE INVENTION

The present invention relates to covering systems for open top truck containers, and in particular, a flexible cover that is mechanically deployed on longitudinally rotatable and laterally retractable arms.

BACKGROUND OF THE INVENTION

Conventional tarp covering systems for trucks include a pair of pivoting arms on opposed sides of an open top container that rotate between a retracted, stowed position in front of the container to an extended unfurled position at the rear wherein the tarp or flexible cover covers the container. The arms project laterally from the sides of the container and increase the overall width of the vehicle. The actuators are generally hydraulic cylinders located outboard of the container and pivot the arms about a fixed shafts. Because of the operating environment for such vehicles, the outboard locations of such components are prone to impact damage. Moreover, in certain jurisdictions, regulations limit vehicle width and accordingly it would be desirable to provide a tarp covering system affording the benefits of current system while complying with applicable restrictions. Examples of such systems include U.S. Pat. No. 5,031,955 to Searfoss, U.S. Pat. No. 4,874,196 to Goldstein, U.S. Pat. No. 4,516,802 to Compton, U.S. Pat. No. 5,058,956 to Godwin, and U.S. Pat. No. 5,129,698 to Cohrs. These systems employ pivoting arms mounted on laterally fixed pivots and accordingly are substantially wider than the container.

Partially laterally retractable pivoting arms have been proposed as disclosed in European Patent 0 581 512 A1. The pivoting arms are laterally retracted by hydraulic cylinders in the forward and rearward positions. While presenting a narrower width than the fixed pivot arms, the arms remain laterally exterior of the container adding to the overall transit width of the vehicle, and if subject to width regulation reduce the width of allowable containers.

It is an object of the present invention to provide a load covering system for open top containers wherein the pivoting arms for deploying the flexible cover reside laterally interior of the sides of the container during travel. A further object is to provide a load covering system wherein the actuators for the arms are located laterally within the sidewalls of the container.

The foregoing object is accomplished in the present invention by pivoting arms mounted on cantilevered rotating shafts that may be laterally retracted and parked beneath the container in both the extended and retracted positions so as not to increase vehicle width during travel and to protect the actuators from damage during transit and operation. According to the invention, a tarp assembly for covering an open top container of a truck, comprises a pair of articulating arm assemblies including lower arms pivotally connected at outer ends to the inner ends of upper arms, said lower arms pivotally connected at lower ends on opposed lateral sides of the container and rotationally mounted adjacent the base of the container about midway along the length of the container; a lateral actuator means for shifting the arm assemblies between a normal retracted position inwardly of the sides of the container and an extended position outwardly of the sides of the container, the lower arms located beneath said container in said retracted position, the upper arms located adjacent an end wall of the container in said retracted position; a retractable flexible cover transversely carried at one end to the outer ends of the arm assembly and connected adjacent the front end of the container at the other end; a rotary actuator for rotating the arm assemblies in said extended positions between forward position wherein said cover is stowed forward of the container and a rearward position wherein said cover overlies the container; and linear actuators connected between said upper arms and said lower arms for varying the angularity therebetween during movement between the forward position and the rearward position.

In another embodiment, particularly suited for container and truck configurations where there are limited mounting locations at the longitudinal center of the chassis, the pivoting arm assemblies are mounted on laterally telescoping rotary actuators, the arm assemblies including telescoping including upper and lower arm sections coupled with linear hydraulic cylinders for extension or retraction, the arrangement allowing the arm assemblies to rotate 180° in the laterally extended position whereby the container cover may be deployed over the open container top, and parked beneath and inward of the container. The arm assemblies are directly rotated from the cantilevered shafts on rotary actuators mounted on the chassis, inwardly of the normal location of prior art actuating systems and within the lateral confines of and beneath the container.

BRIEF DESCRIPTION OF THE DRAWINGS

The above and other objects and features of the invention will become apparent upon reading the following written description of the invention taken in conjunction with the accompanying drawings in which:

FIG. 4 is a rear end view of the tarp covering system in the covered laterally extended position;

FIG. 5 is a view similar to FIG. 4 showing the tarp covering system in the covered laterally retracted position;

FIG. 17 is a fragmentary bottom view taken along line 17—17 in FIG. 12 showing the upper arms in the laterally extended position;

FIG. 18 is a view similar to FIG. 17 showing the upper arms in the laterally retracted position;

FIG. 20 is a fragmentary bottom view taken along line 20—20 in FIG. 19 showing the upper arms in the laterally extended position;

FIG. 21 is a view similar to FIG. 20 showing the upper arms in the laterally retracted position;

DETAILED DESCRIPTION OF THE PREFERRED EMBODIMENTS

Figure 1:
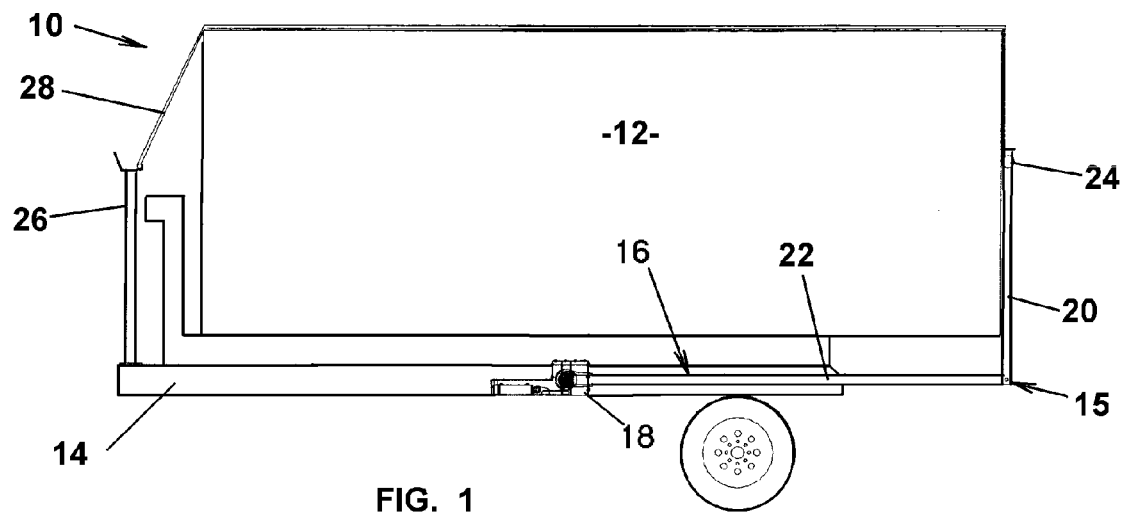
FIG. 1 is a side elevational view of a tarp covering system for an open top truck container in accordance with an embodiment of the invention showing the tarp in the covered position.

Referring to FIGS. 1 through 7 of the drawings, in one embodiment of the invention, there is shown a truck 10 having an open top container 12 supported on a rear chassis 14. The container may a various designs conventionally employed in trash hauling and is generally characterized by a rectangular horizontal base peripherally bounded by vertically extending laterally spaced sidewalls and longitudinally spaced front and rear end walls. Depending on the capacity of the container, the length and height of the container vary accordingly.

The truck 10 is provided with a tarp covering system for a wide range of container sizes and generally comprises a pair of articulating arm assemblies 16 at the lateral sides thereof. The arm assemblies, as hereinafter described in detail, are stowed beneath the base of the container and inwardly of the sidewalls during loading and unloading of the container and during transportation. For transporting, the arm assemblies 16 are laterally extended outward of the sidewalls and pivot from a forward horizontal position to a rearward horizontal position to deploy a cover, such as a rectangular tarp over the upper open end of the container to prevent cargo loss during travel. The tarp may be formed of conventionally used materials and has a length sufficient for covering the longest and tallest containers and a width the same or slightly narrower than the container width.

The arm assemblies 16 are supported at lower ends by laterally retractable and extendable pivot assemblies 18 mounted on the truck chassis 14 beneath the base of the container. The arm assemblies 16 have upper arms 20 pivotally connected to lower arms 22. The lower arms 22 are connected at lower ends to the cantilevered outer ends of the output shafts of the pivot assemblies. In the present embodiment, a rollup tarp spool assembly 24 is transversely supported at the outer ends of the upper arms 20. As described in a subsequent embodiment, the tarp spool assembly may be alternatively mounted on the container or the chassis.

Figure 2:
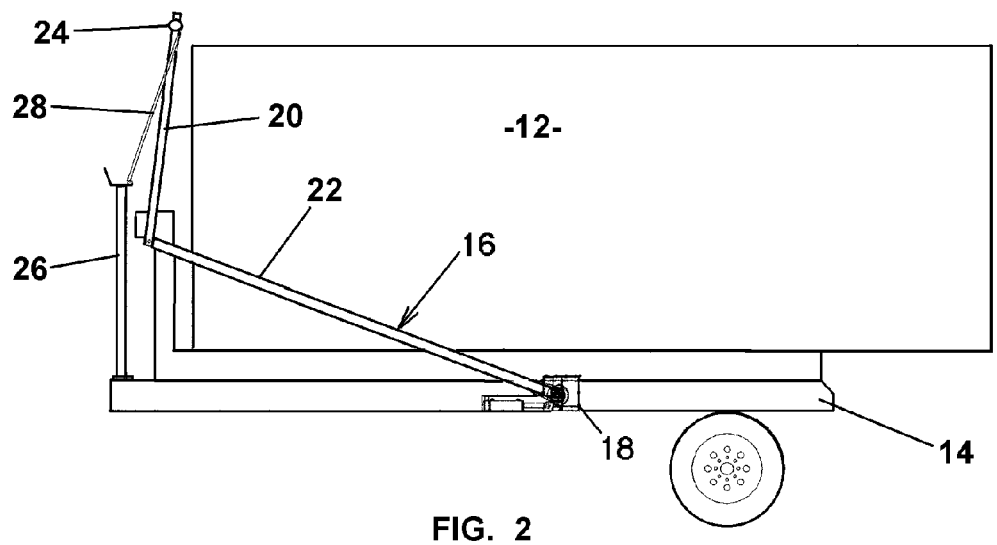
FIG. 2 is a view similar to FIG. 1 showing the tarp in a preliminary unfurling position.

The arm assemblies 16 are pivotable between a laterally retracted stowed forward position (FIGS. 3 and 5) wherein the spool assembly 24 is supported on a vertically extending mast support 26 at the front of the container 12 and a laterally retracted deployed rearward position (FIGS. 1 and 5) at the rear of the container. As the arm assemblies move from the laterally extended forward position a generally rectangular flexible tarp 28 unwinds from the spool assembly 24 and overlies the open top of the container 12. The free end of the tarp is attached at the top of the mast support 26. An intermediate position is shown in FIG. 2. In the forward and rearward positions, the lower arms 22 of the arm assemblies 16 are laterally inwardly retracted and parked beneath the outer side margins of the container 12 and the uppers arms 20 are adjacent the end of the container. Accordingly, the arm assemblies do not increase the overall travel width of the vehicle thereby complying with stringent regulations thereon. During actuation, the arm assemblies 16 are laterally extended from a stowed position beneath the outer side margins of the container (FIG. 5) to an extend position beyond the sides of the container (FIG. 4).

Figure 6:
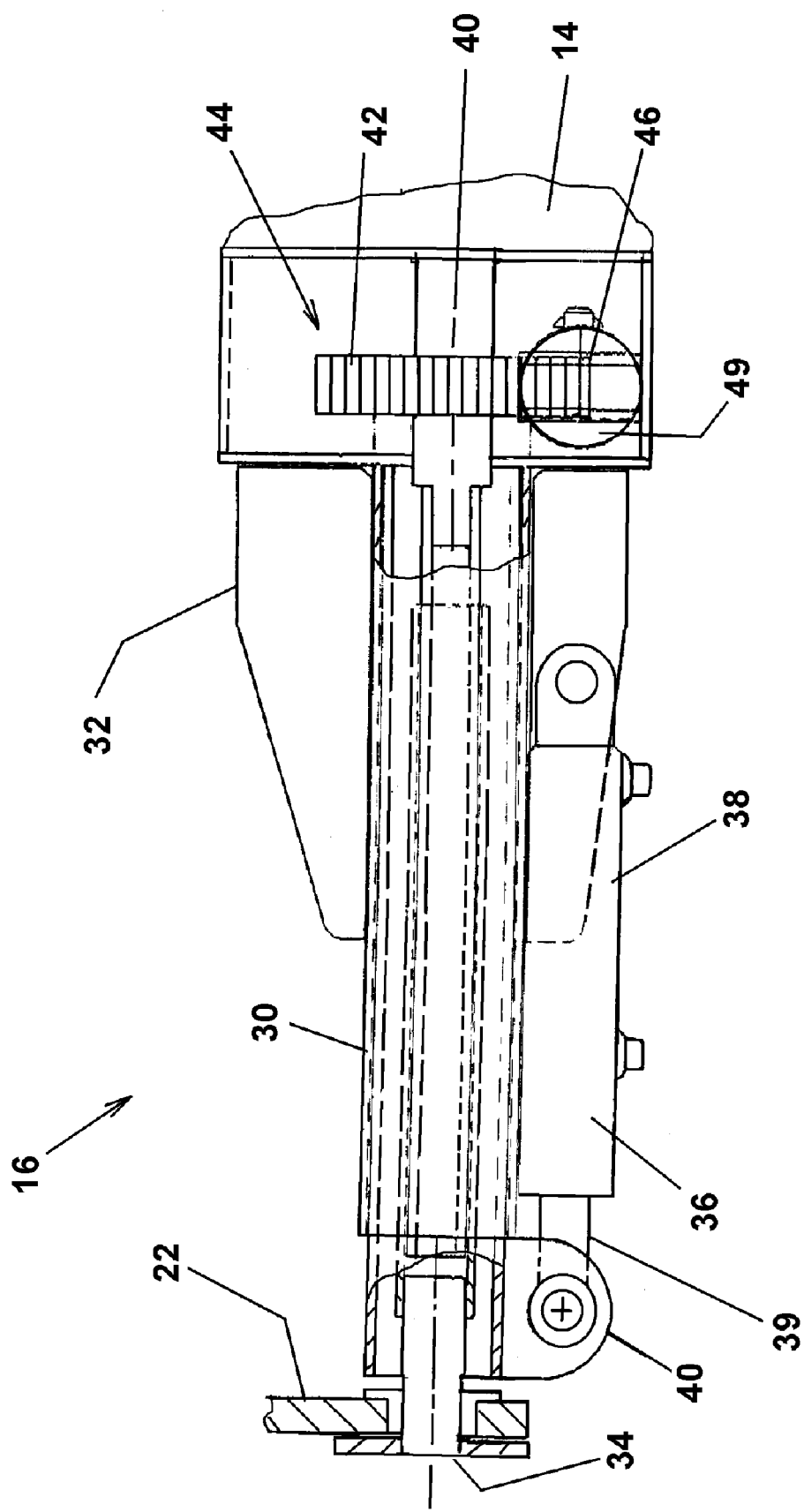
FIG. 6 is an end view of the rotary actuating system for the tarp covering system of FIG. 1.
Figure 7:
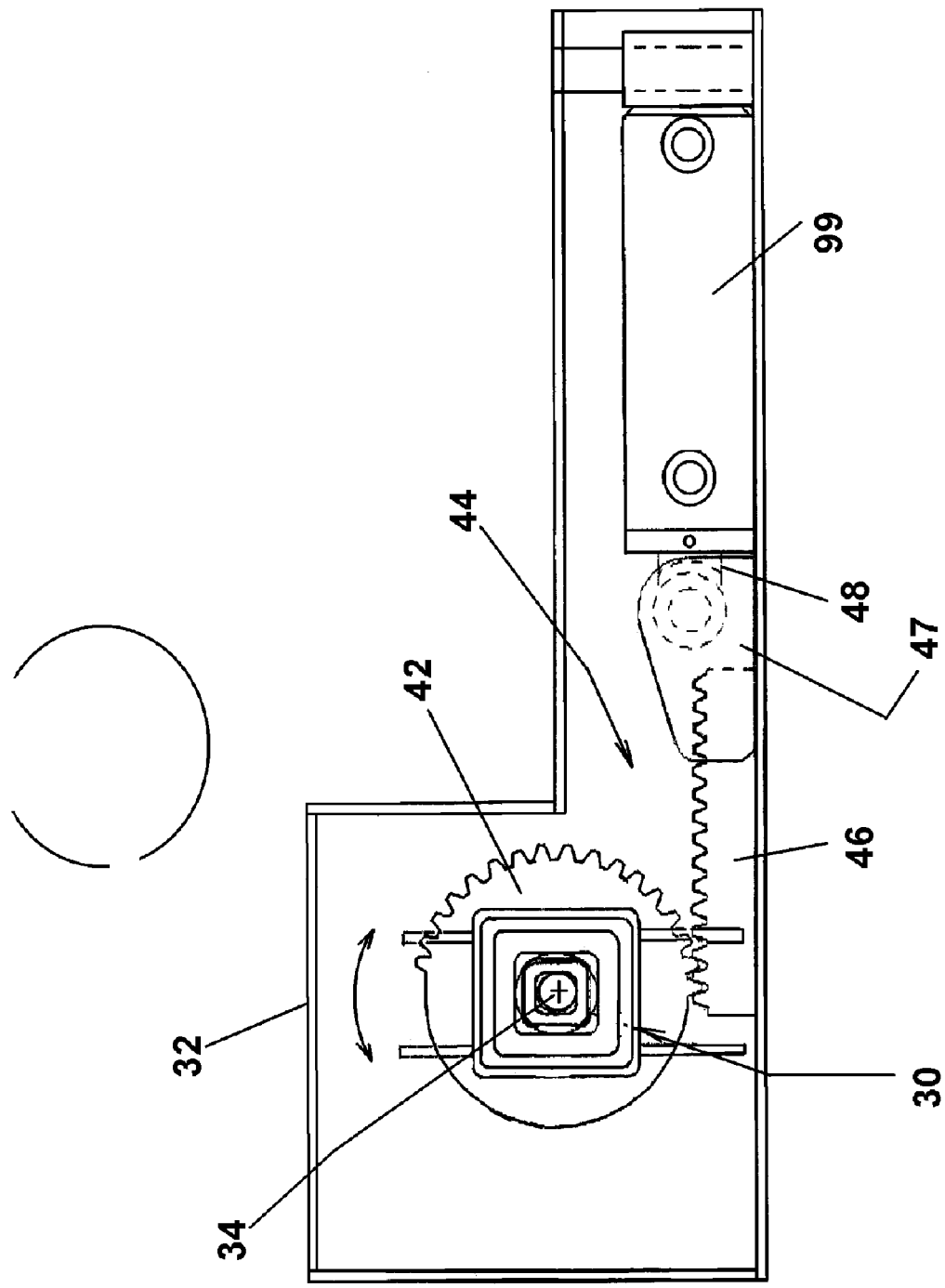
FIG. 7 is a side view of the rotary actuating system shown in FIG. 6.

As shown in FIGS. 6 and 7, the pivot assemblies 16 comprise a telescoping, rotationally locked sleeve assembly 30 of coaxial rectangular tubing mounted in a housing 32 attached to the chassis, located inwardly of the sides of the container and therebeneath. The sleeve assembly 30 includes an output shaft 34 fixed at the outer end to the lower end of the lower arm 22. The sleeve assembly 30 is laterally shifted between an extended position and a retracted position by a linear actuator 36 in the form of a hydraulic piston assembly. The actuator 36 includes a cylinder 38 connected at a rear end to the housing 32 and having an output shaft 39 connected to a drive collar 40 fixedly mounted on the shaft 34. Accordingly, the actuator 36 under control of the operator and conventional hydraulic circuitry and control effects laterally inward and outwardly movement of the shaft 39 to extend and retract the sleeve assembly 30 to move the arm 22 between the laterally extended and retracted positions.

The sleeve assembly 30 is coupled at the inner end to an output shaft 40 of the drive gear or pinion 42 of a rack and pinion set 44. The rack 46 of the set 44 is slidably longitudinally supported the housing 72. The rack 46 is connected by drive coupling 47 to the output shaft 48 of a linear actuator 49, preferably a hydraulic piston assembly. After extension of the arm assemblies by the actuator 34, upon movement the of the piston of the actuator 49, the rack 46 is translated to effect a corresponding rotation of the gear 42 thereby rotating the sleeve assembly 30 and the attached arm 22 of the arm assembly 16.

The outer ends of the upper arms 20 of the arm assemblies 16 are interconnected connected to an extendable strut assembly 52. The upper arms 22 are moved between a laterally extended position (FIG. 4) and a retracted position (FIG. 5) by a fluidic linear actuator 54, such as a hydraulic piston assembly. The spool assembly 24 is laterally supported on the upper arms by telescopic arms 56 that accommodate the lateral movement. The actuator 54 is cojointly extended and retracted in tandem with the lower actuators 36 during lateral movement of the arm assemblies between the retracted parked position and the extended tarp coverage position.

Figure 3:
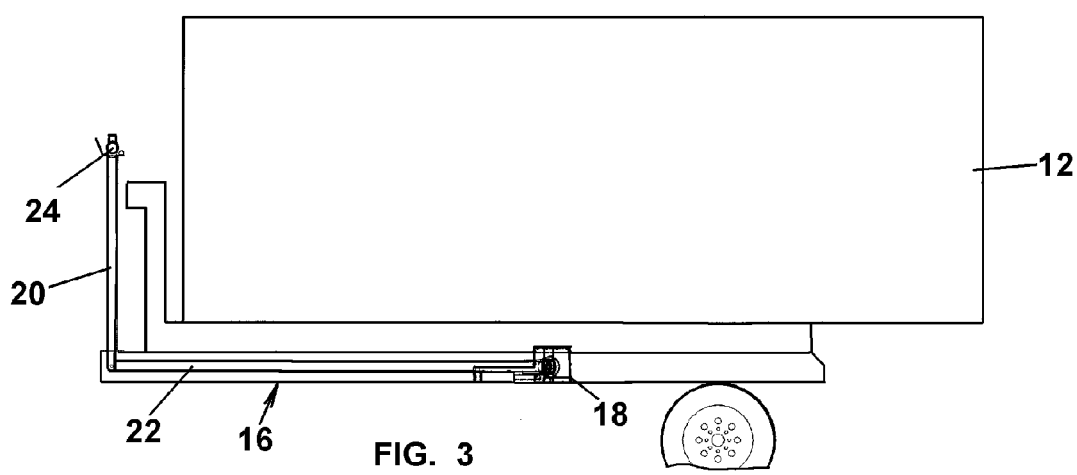
FIG. 3 is a view similar to FIG. 1 showing the tarp covering system in the uncovered laterally retracted position.
Figure 8:
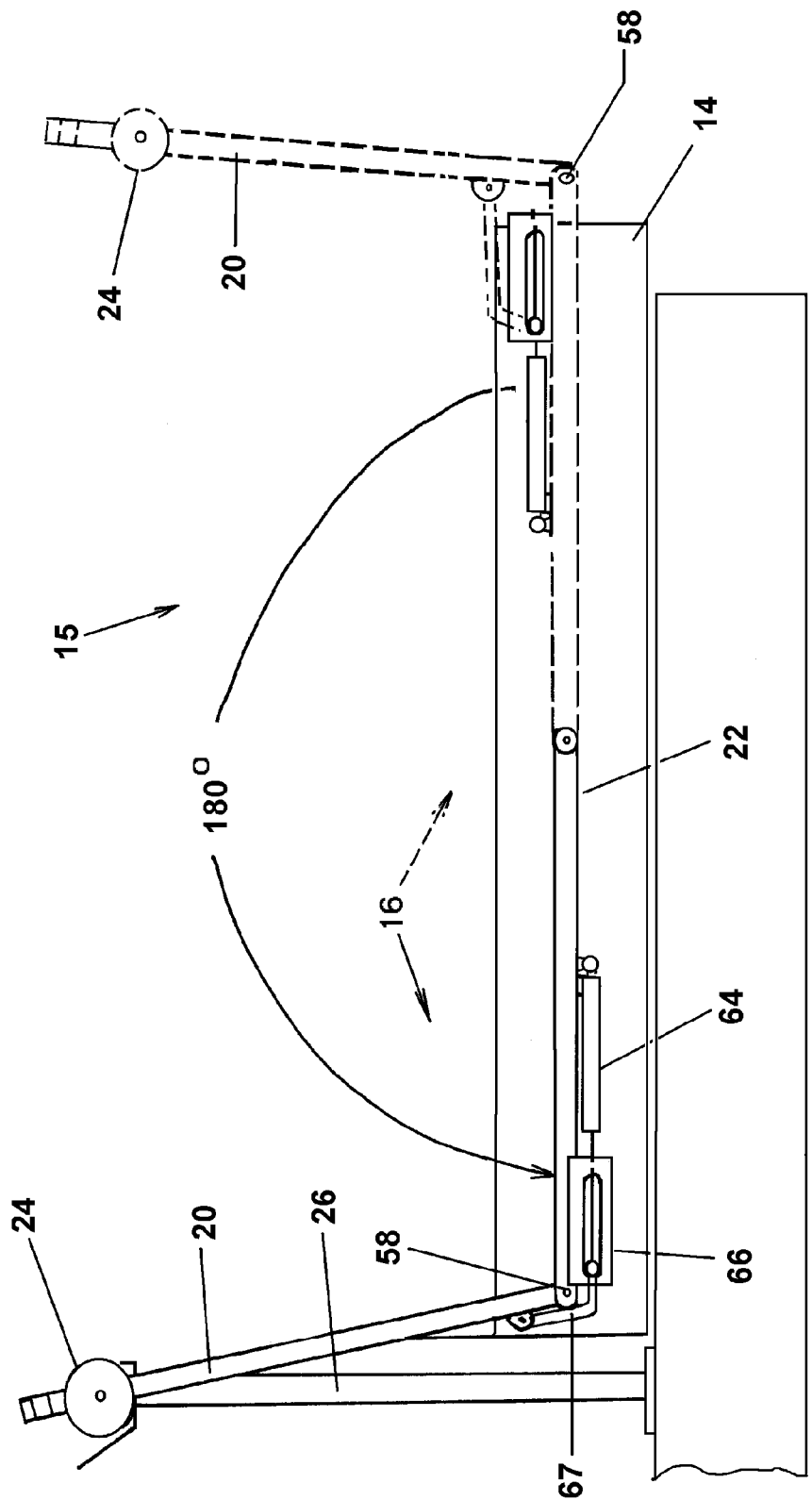
FIG. 8 is a side view of the tarp covering system of FIG. 1 showing in solid lines the tarp arms in the uncovered position and in dashed lines in the covered position.

As shown in FIG. 8, the base or lower arm 22 of the arm assemblies 16 is supported at about the mid length of the container 12 on the chassis 14. Each lower arm 22 has a length that extends beyond the ends of the container 12 in the rotated positions. As illustrated, the arm 22 is rotated about 180°. The outer ends of the lower arms 22 are transversely pivotally connected by transverse pin connections 58 to the lower ends of the upper arms 20. A linear actuator assembly 64, preferably a hydraulic piston assembly, is connected by a linkage 66 between the upper arm 20 and lower arm 22. The linkage 66 includes an L-shaped arm 67 pivotally connected at an upper end to the lower end of the arm 20. The lower end of the arm 67 is connected to a cross pin 68 received in a longitudinal slot in brackets 69 mounted on the lower arm 22, and also connected to the output shaft of the actuator 64. The piston of the actuator is extended and retracted to effect relative rotation about the pin connections 56 to articulate arms 20, 22 and accommodate the illustrated path of the spool assembly 24 during movement between the stowed position and the extended position shown in dashed lines as shown in FIGS. 1 through 3.

At the end positions, the lower arms 22 are moved to the stowed parked position beneath the container with the upper arms 20 normal thereto and adjacent an end wall of the container. Accordingly, the transporting width of the vehicle is determined solely by the container width so as to comply with any width regulations while providing the automated benefits of the articulating coverage system.

Referring to FIGS. 9 through 12 of the drawings, in another embodiment of the invention, there is shown a truck 100 having an open top container 102 supported on a chassis 104 at the rear. The truck 100 is provided with a tarp covering system 105 comprising a pair of pivotal and laterally shiftable arm assemblies 106 at the lateral sides thereof supported at lower ends by retractable pivots assemblies 108 mounted on the truck chassis for rotation about a transverse axis 109 and extension and retraction along the axis 109. The arm assemblies 106 have upper ends carrying a tarp on a spool assembly 110. The arm assemblies 106 are pivotable between a retracted stowed forward position (FIG. 9) wherein the spool assembly 110 is supported on a vertical mast support 112 on the chassis at the front of the container, through intermediate positions at the front and rear ends of the container (FIGS. 10 and 11) to an extended deployed rearward position (FIG. 12) at the rear of the container whereat the flexible tarp 114 is unwound from the spool assembly 110 and overlies the open top and front and rear walls of the container.

Figure 14:
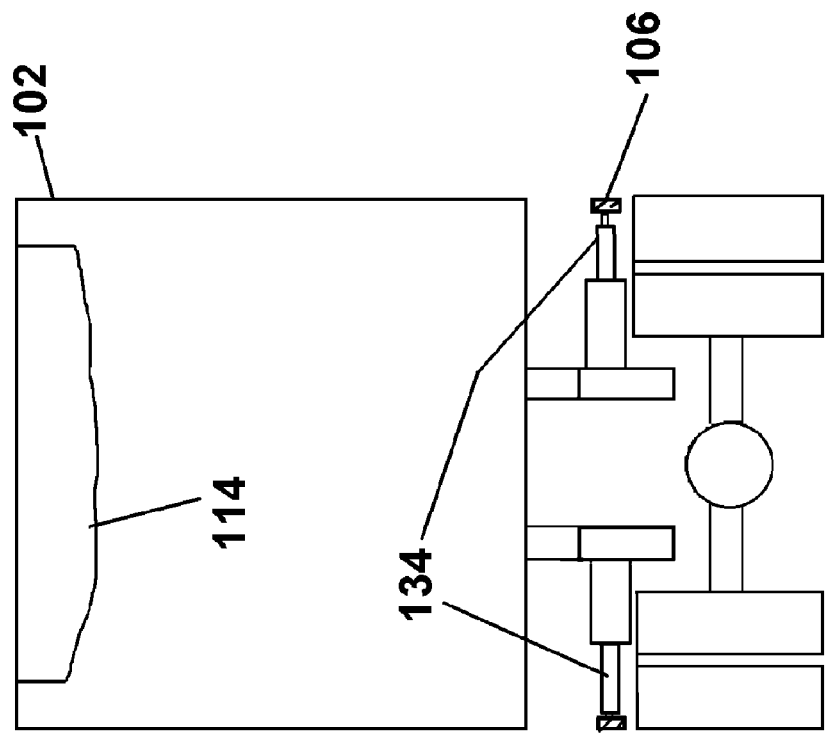
FIG. 14 is an end view showing the tarp covering system in the covered laterally retracted position.
Figure 13:
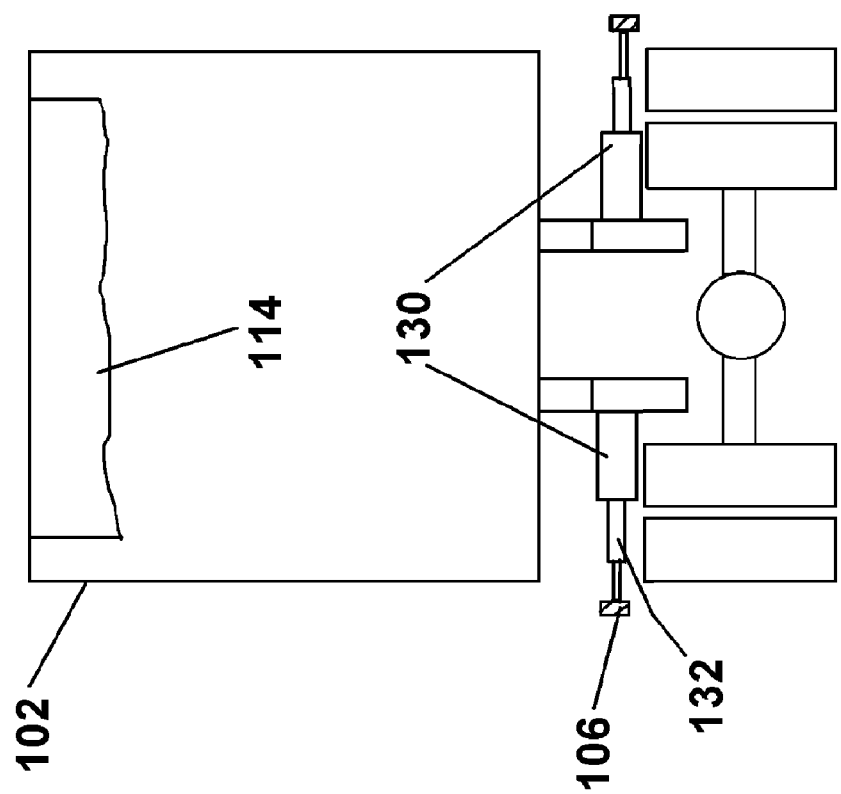
FIG. 13 is an end view showing the tarp covering system in the covered laterally extended position.

Referring to FIG. 14, in the parked forward and rearward positions, the arm assemblies 106 are laterally inwardly retracted and stowed beneath the outer side margins of the container not contributing to the overall traveling width. During actuation, the arm assemblies are laterally extended beyond the sides of the container (FIG. 13) to allowable the pivotal movement of the arm assemblies to extend and retract the tarp 114.

Each arm assembly includes a cylindrical lower arm 120, including a lower base 122 coupled to the output of the pivot assembly 108, and a tubular upper arm 124 telescopically supported by the lower arm 120. A double acting hydraulic cylinder 126 is connected at a lower end to the lower arm 120 and has an output shaft 127 connected to the upper arm 124. Accordingly, by conventional hydraulic circuitry, the cylinder may be actuated to telescopically shift the upper arm relative 124 to the lower arm 120 between retracted and extended positions. The spool assembly is laterally supported at the outer ends of the upper arms at telescoping connections allowing the arm assemblies to shift between the retracted and extended positions as described with reference to the first embodiment. More particularly as shown in FIGS. 17 and 18, the upper arms 124 of the arm assemblies 106 are connected to an extendable strut assembly 128. The upper arms 122 are moved between a laterally extended position (FIG. 17) and a retracted position (FIG. 18) by a fluidic linear actuator 129. The spool assembly 110 includes telescopic arms 131 that accommodate the lateral movement. The actuator 129 is extended and retracted in tandem with the lower actuators, described below, during lateral movement of the arm assemblies between the retracted parked position and the extended tarp coverage position.

Figure 15:
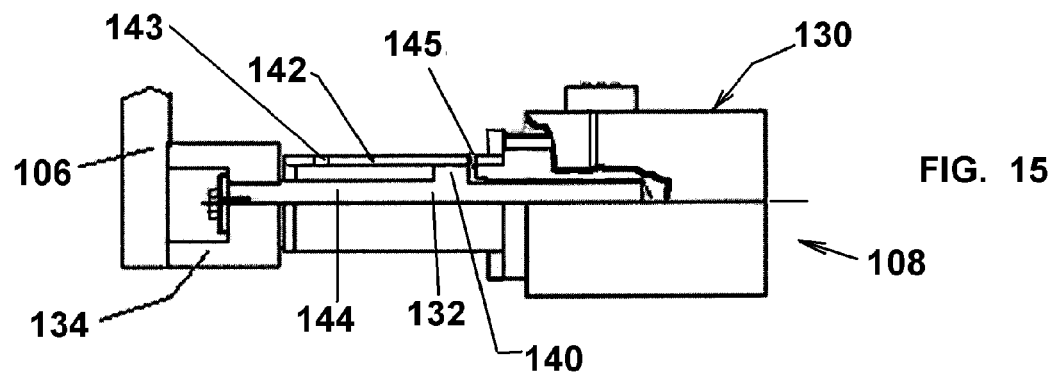
FIG. 15 is a view of the rotary actuator assembly for the embodiment of FIG. 9 in the laterally retracted position.
Figure 16:
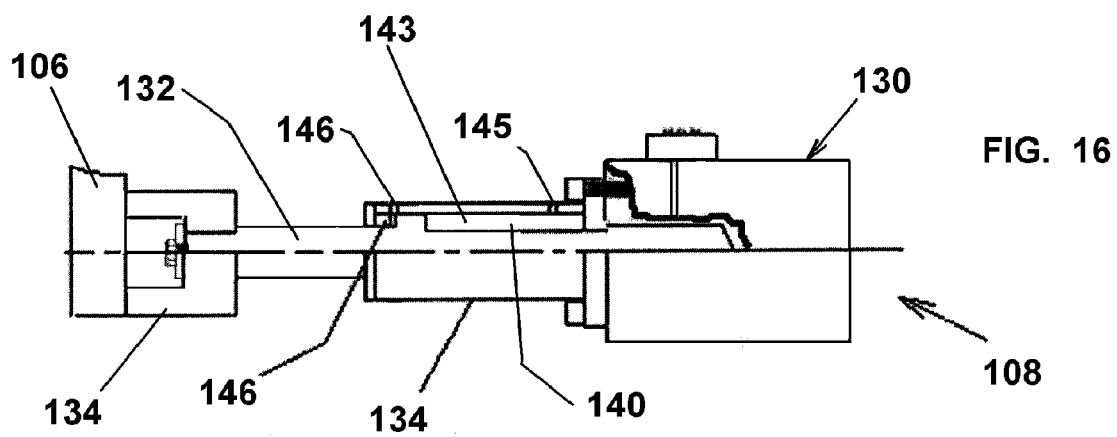
FIG. 16 is a view similar to FIG. 15 showing the rotary actuary assembly in the laterally extended position.

As shown in FIGS. 15 and 16, each pivot assembly 108 comprises a rotary actuator 130 mounted on the chassis inwardly of the sides of the container and therebeneath. The rotary actuator 130 has a telescoping shaft 132 laterally outwardly terminating with a hub 134 rotatably coupled with the lower end of the arm assembly 106. The rotary actuator 130 is preferably of the double helical type as disclosed in U.S. Pat. No. 4,313,367 to Weyer. The end of the shaft 132 is telescopically rotatably coupled to the output of the actuator 130 whereby the shaft rotates 180° to rotate the arm assemblies 106 between the forward and rearward positions under the control of conventional hydraulic circuitry.

The shaft 132 includes an enlarged piston 140 slidably supported in a cylindrical sleeve 142 mounted on the actuator. As shown in FIG. 15, the piston 140 and the sleeve 142 establish at an inner end an expansion chamber 143. As shown in FIG. 16, the piston 140 and the sleeve establish at the outer end a retraction chamber 144. When the expansion chamber 143 is pressurized through radial port 145, the shaft 130 is shifted to the position shown in FIG. 15 thereby laterally inwardly retracting the arm assembly 106. When the retraction chamber 144 is pressurized through radial port 146, the shaft is shifted to the position shown in FIG. 16 thereby laterally outwardly extending the arm assembly 106. Fluid ports 145, 146 and 162 on the sleeve 140 are connected by fluid lines with a fluid source and control assembly for selectively routing pressurized fluid to the retraction chamber 144 or the extension chamber 143 to shift the shaft 132 between the operative positions.

Figure 9:
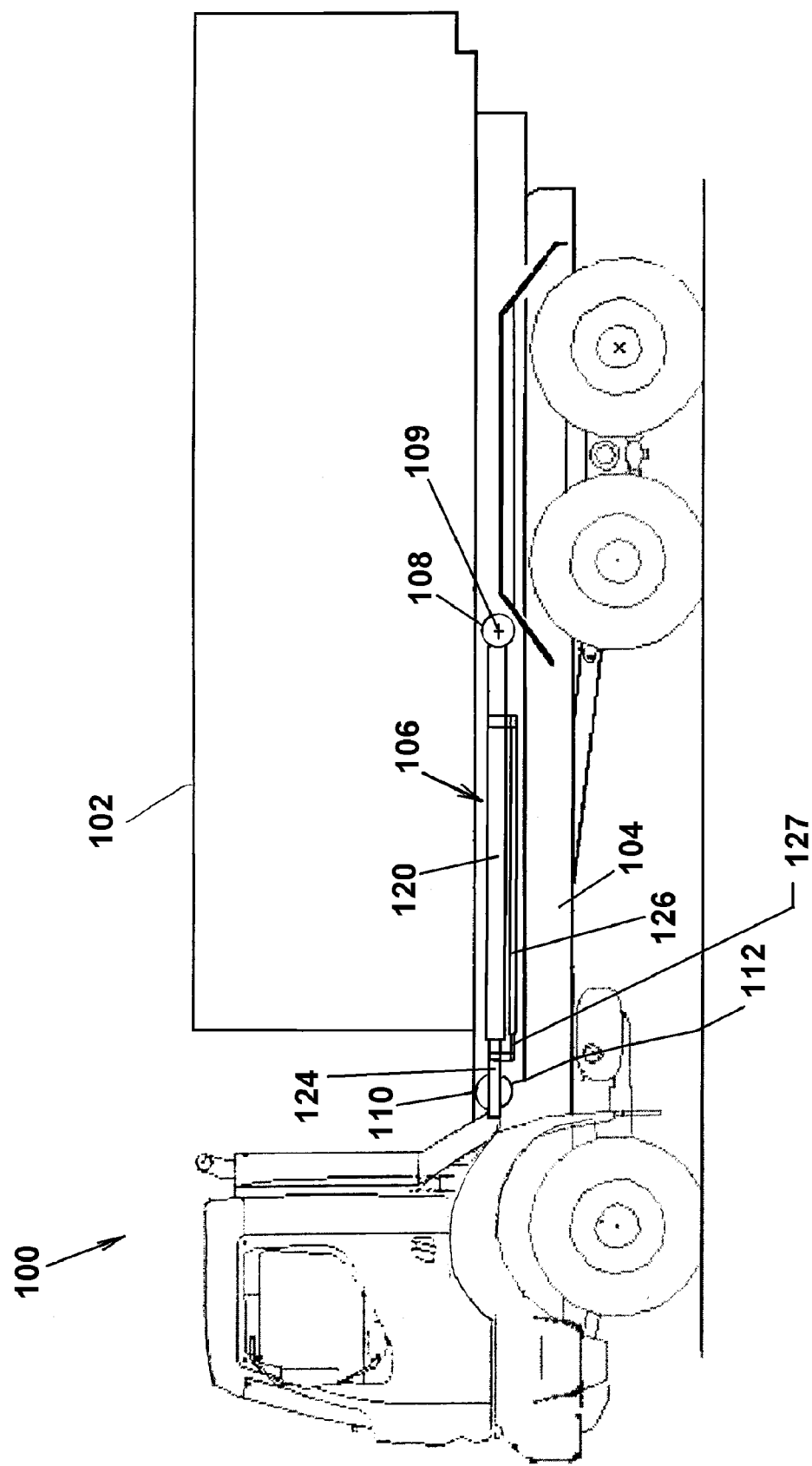
FIG. 9 is a side view of the tarp covering system according to another embodiment in the uncovered laterally retracted position.
Figure 10:
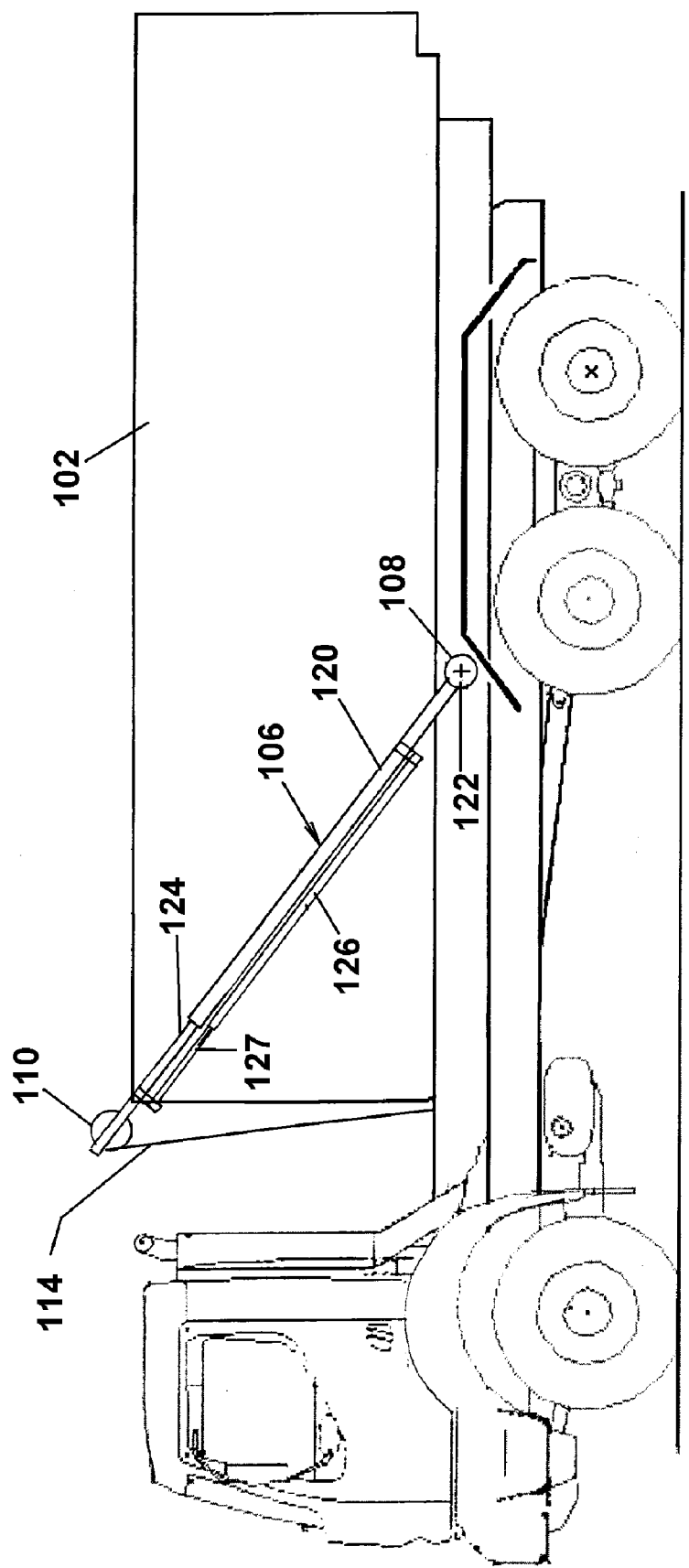
FIG. 10 is a view similar to FIG. 9 showing the tarp covering system in a partially raised position.
Figure 11:
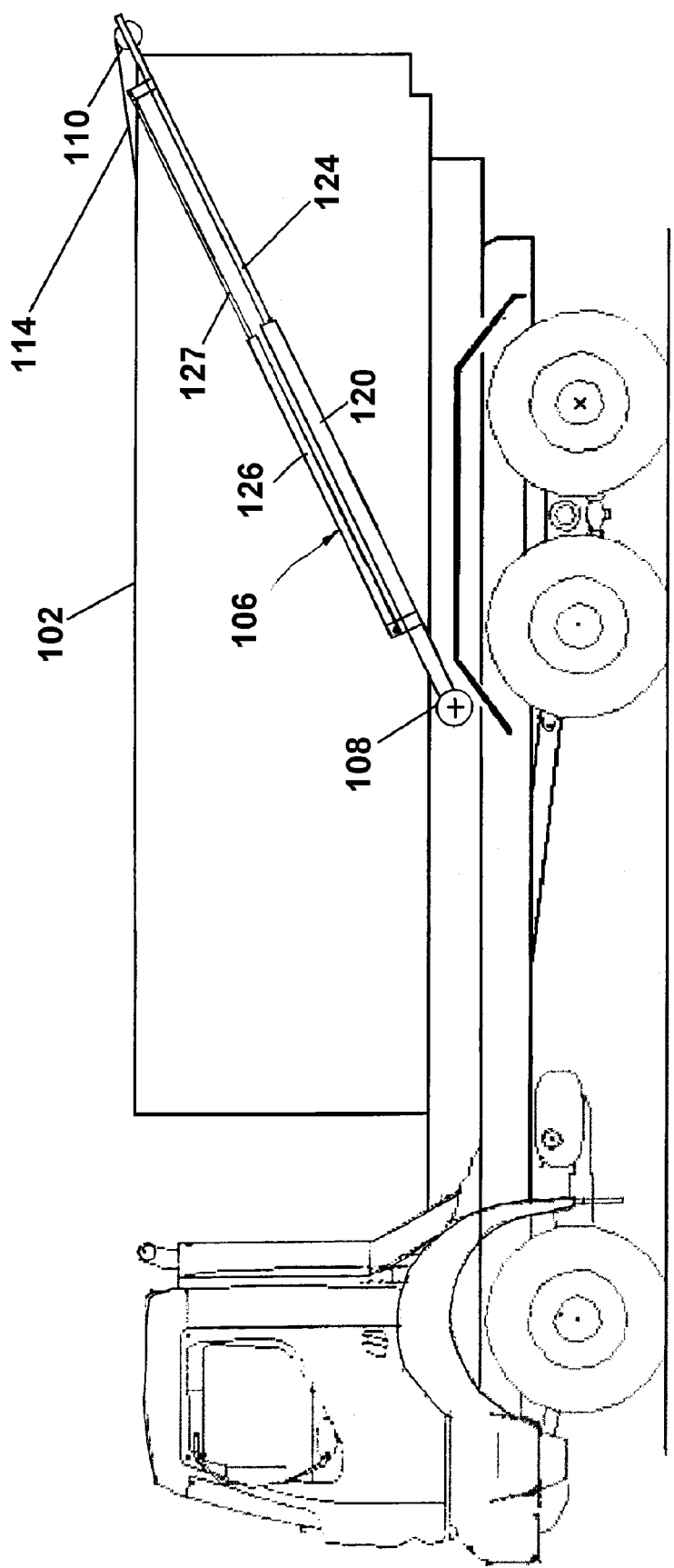
FIG. 11 is a view similar to FIG. 9 showing the tarp covering the open top of the container.
Figure 12:
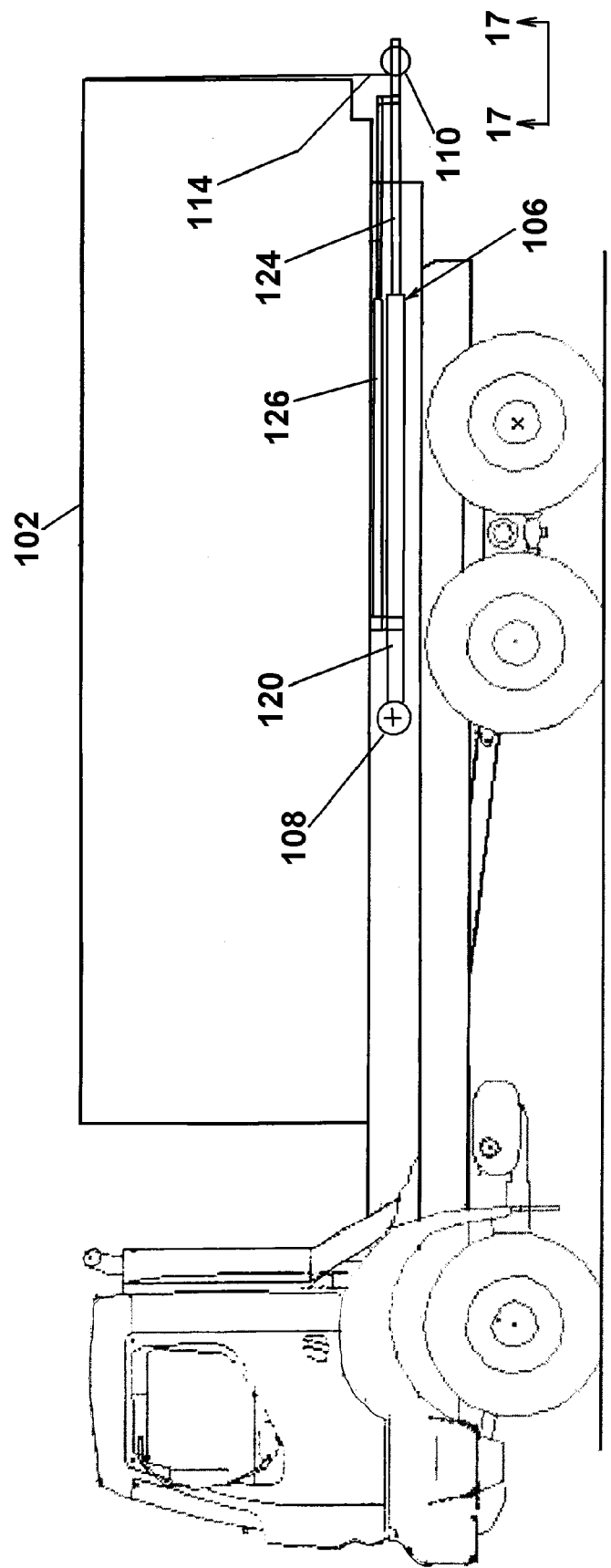
FIG. 12 is a view similar to FIG. 9 showing the tarp in the covered position.

In operation, the arm assemblies 106 are initially parked in the forward inwardly retracted positions as shown in FIGS. 9 and 14. When it is desired to cover the container, the lateral hydraulic control system is operated to pressurize the extension chambers thereby shifting the shafts and the arm assemblies outwardly to the extended positions shown in FIG. 13. The rotary actuator 130 is actuated by conventional hydraulics circuitry to pivot the arm assemblies rearwardly. Concurrently, the cylinders 126 are extended to control the effective arm length to keep the spool assembly 110 adjacent the front wall of the container in movement from the position of FIG. 9 to the position of FIG. 10. Thereafter the arm assembly is pivoted to the position of FIG. 11 adjusting the arm length as required to position the spool assembly at the rear end of the container. The pivoting of the arm continues to the position of FIG. 12 shortening the effective arm length as required. When rearwardly horizontal, the shafts of the actuators are retracted to park the arm assemblies below and inwardly of the sides of the container.

Figure 19:
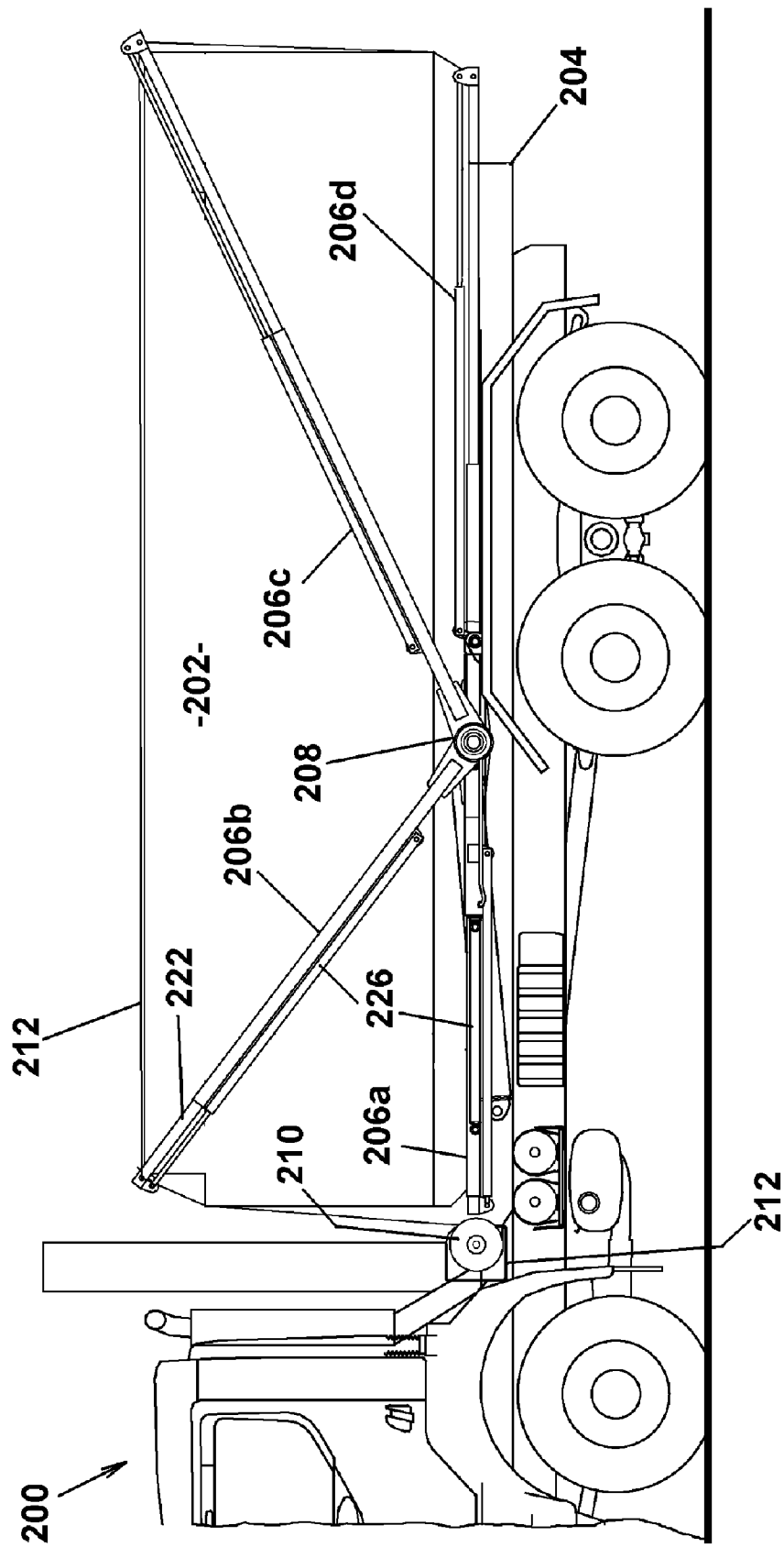
FIG. 19 is a side elevational view of the tarp covering system in accordance with a further embodiment of the invention.

Referring to FIG. 19, there is shown a further embodiment of the invention wherein the tarp spool assembly is carried on the truck chassis or container. While it is normally preferred to have the spool assembly carried on the arm assemblies to prevent dragging the tarp across exposed sharp objects in the container thereby damaging the tarp material, it certain instances such as an existing tarp installation or to reduce the weight on the arms, a vehicle mounted arrangement may be preferred. Therein, a truck 200 has an open top container 202 supported on a chassis 204 at the rear. The truck 200 is provided with a tarp covering system 205 comprising a pair of arm assemblies 206 at the lateral sides thereof supported at lower ends by retractable pivot assemblies 208 mounted on the truck chassis 204 for rotation about and extension and retraction with respect to a transverse axis. The arm assemblies 206 and the pivot assemblies 206 are substantially the same as described with reference to the prior embodiment with the differences detailed below.

A spool assembly 210 carrying a tarp 212 is mounted transversely on the chassis 204 at the lower front end of the container 202. The arm assemblies 206 are pivoted between a retracted stowed forward position 206*a* wherein the spool assembly 210 is supported on a rest support 212 at the front of the container 202, through intermediate positions 206*b* and 206*c* at the front and rear ends of the container to an extended deployed rearward position 206*d* at the rear of the container whereat the flexible tarp 212 is unwound from the spool assembly 210 and overlies the open top and front and rear walls of the container. In the parked forward and rearward positions, the arm assemblies 206 are laterally inwardly retracted by the pivot assemblies 208 and stowed beneath the outer side margins of the container. During extension and retraction of the tarp, the arm assemblies 206 are laterally extended beyond the sides of the container as described above.

As shown in FIGS. 20 and 21, the upper arms 222 of the arm assemblies 206 are connected to an extendable strut assembly 252. The free end of the tarp 212 is carried on a telescopic cross bar 256. The upper arms 222 are moved between a laterally extended position (FIG. 20) and a retracted position (FIG. 21) by a fluidic linear actuator 254. The cross bar 256 accommodates the lateral movement. The actuator 254 is extended and retracted in tandem with the lower actuators, described below, during lateral movement of the arm assemblies between the retracted parked position and the extended tarp coverage position.

In operation, the arm assemblies 206 are initially parked in the forward inwardly retracted position 206*a*. When it is desired to cover the container, the lateral hydraulic control system of the pivot assemblies 208 are actuated thereby shifting the shafts and the arm assemblies outwardly to the extended positions and the rotary actuator is actuated to pivot the arm assemblies rearwardly. Concurrently, the cylinders 226 are extended to control the effective arm length to keep the free end of the tarp 212 adjacent the front wall of the container in movement from the position 206*a* to 206*b*. Thereafter the arm assembly is pivoted to the position 206*c* adjusting the arm length as required to position the free end of the tarp 212 at the rear end of the container. The pivoting of the arm continues to the position 206 *d* FIG. 12 shortening the effective arm length as required. When rearwardly horizontal, the shafts of the cylinders 226 are retracted to park the arm assemblies below and inwardly of the sides of the container.

Figure 22:
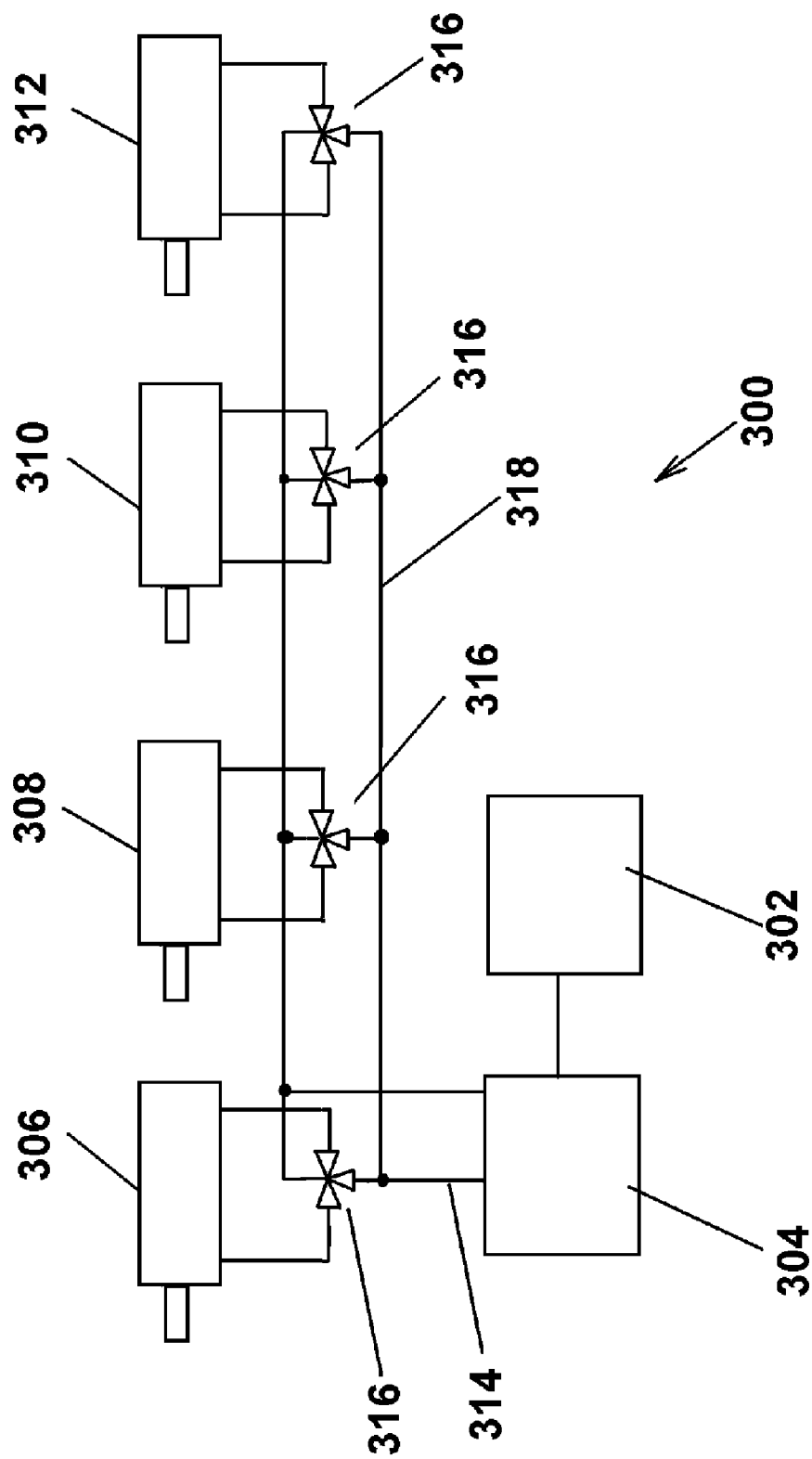
FIG. 22 is a schematic drawing of the actuator control system for embodiments of the tarp covering system.

The control system for the tarp covering systems described above may employ any conventional and appropriate hydraulic circuitry for enabling discrete control of the various linear and rotary actuators used in the described embodiments. Referring to FIG. 22 showing a representative arrangement, a control system 300 for a tarp covering system includes a hydraulic pump 302 operated by the vehicle engine 304. Actuators 306, 308, 310 and 312 are fluidly coupled with the supply line 314 of the pump 302 at three-way valves 316. The return lines of the actuators are fluidly coupled with the return line 318 of the pump. A pair of actuators 306 controls the lateral extension of the arm assemblies. Another pair of actuators 308 controls the rotation of the arm assemblies. A further pair of actuators 310 controls the effective length and articulation of the arm assembly. The actuator 312 controls the effective length of the upper ends of the arm assemblies. Each of the foregoing actuators, in pairs as required, may be discretely controlled to effect the lateral extension and contraction of the arm assemblies, the semi-circular rotation of the arm assemblies between covered and uncovered conditions, the location of the tarp during traverse about the container, and the change in lateral width at the upper ends. The valves may be operated cojointly, through joystick controllers, for operation of the arm rotation and articulation and in tandem for the lateral control movements.

Figure 23:
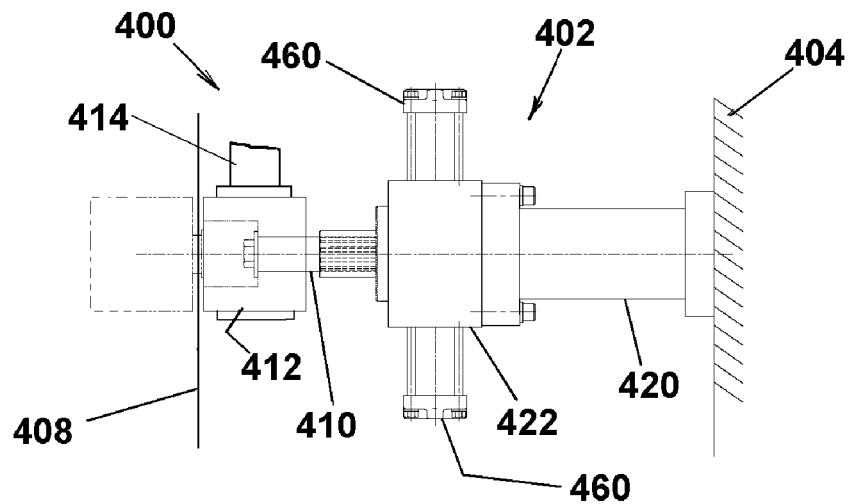
FIG. 23 is a top view of a view of a rotary actuating system for a tarp covering system in accordance with a further embodiment of the invention.
Figure 24:
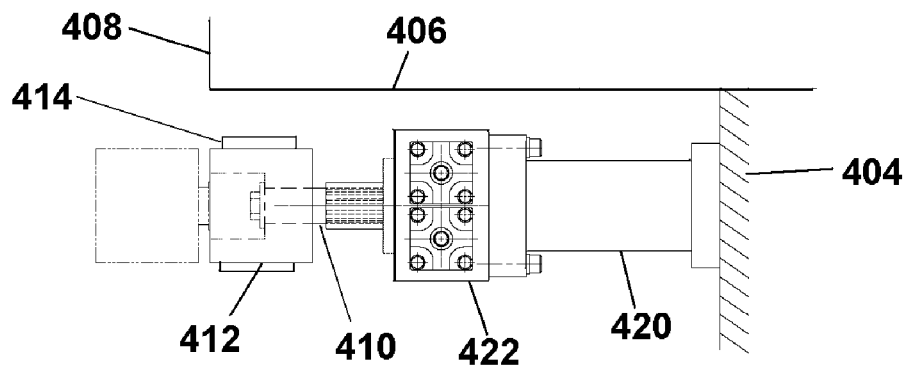
FIG. 24 is a side view of the rotary actuating system of FIG. 23.
Figure 25:
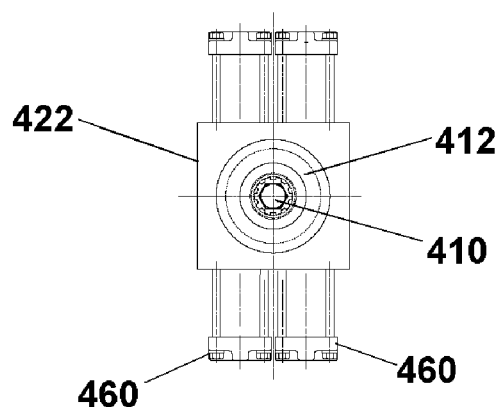
FIG. 25 is a front view of the rotary actuating system of FIG. 23.

A further embodiment of the invention is shown in FIGS. 23 through 25. Therein, the tarp covering system 400 includes a pair of rotary actuating systems 402 mounted on opposed side frames 404 of the truck chassis and extending laterally outward therefrom. The rotary actuating system 402 is located beneath the container 406 and laterally inward of the sidewall 408 thereof. The actuating system 402 includes an output shaft 410 that is coupled to the hub 412 of the lower tarp arm 414. Each actuating system 402 including a linear actuator 420 operatively coupled with a rotary actuator 422. The linear actuator 420 reciprocates the shaft 410 and hub 412 from a retracted inboard position shown in solid lines, inboard of the side wall 408, to an extended outboard operative position shown in dashed lines wherein the outer end of the shaft 410 and the hub 412 are beyond the side wall 408. The rotary actuator 422 for rotates the shaft 410 and the hub 412 about a lateral horizontal axis 424 for moving the lower tarp arm 414 between the front and rear positions as described with reference to the preceding embodiments.

Figure 26:
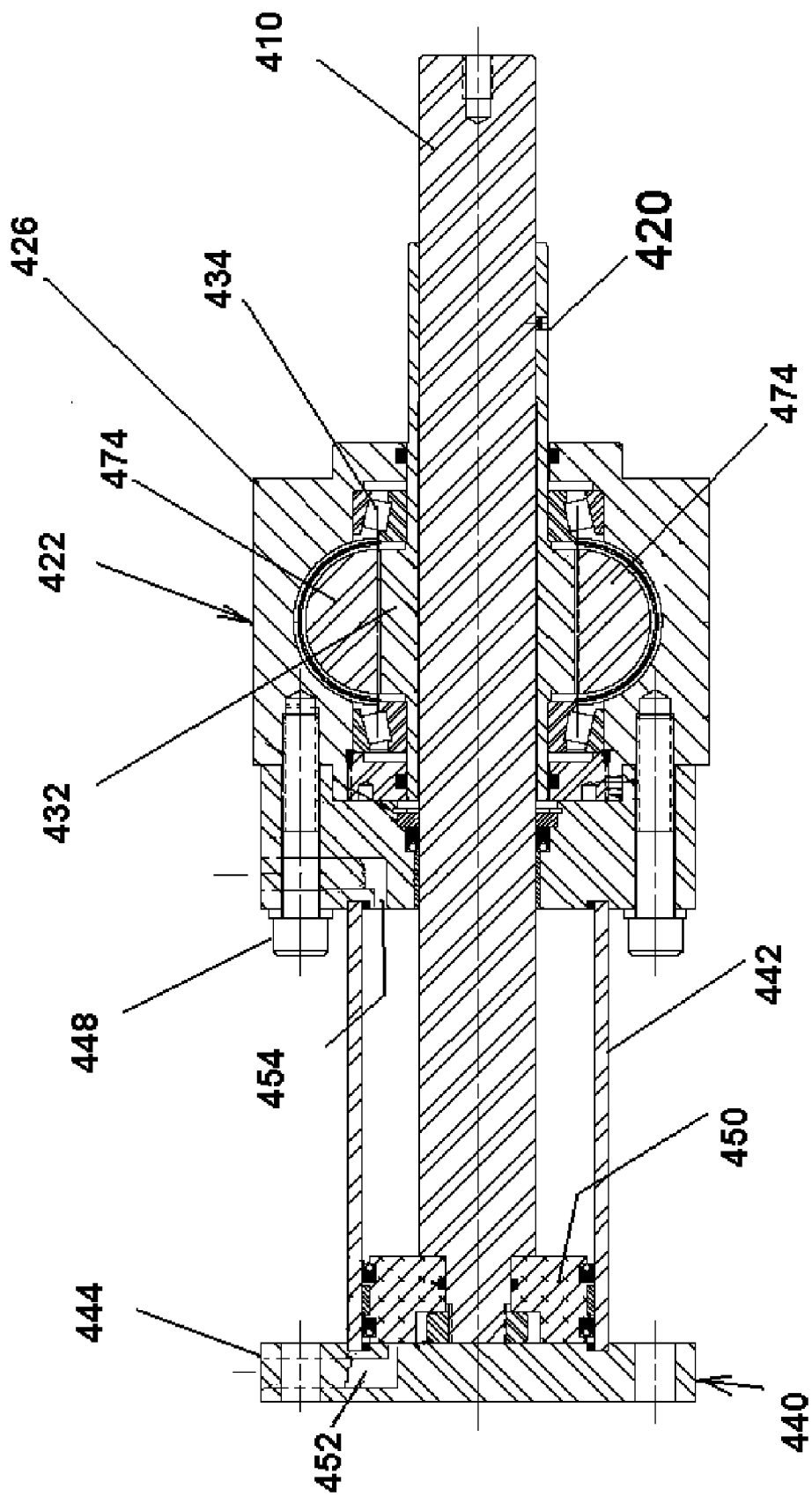
FIG. 26 is a cross sectional view of the rotary actuating system of FIG. 23.
Figure 27:
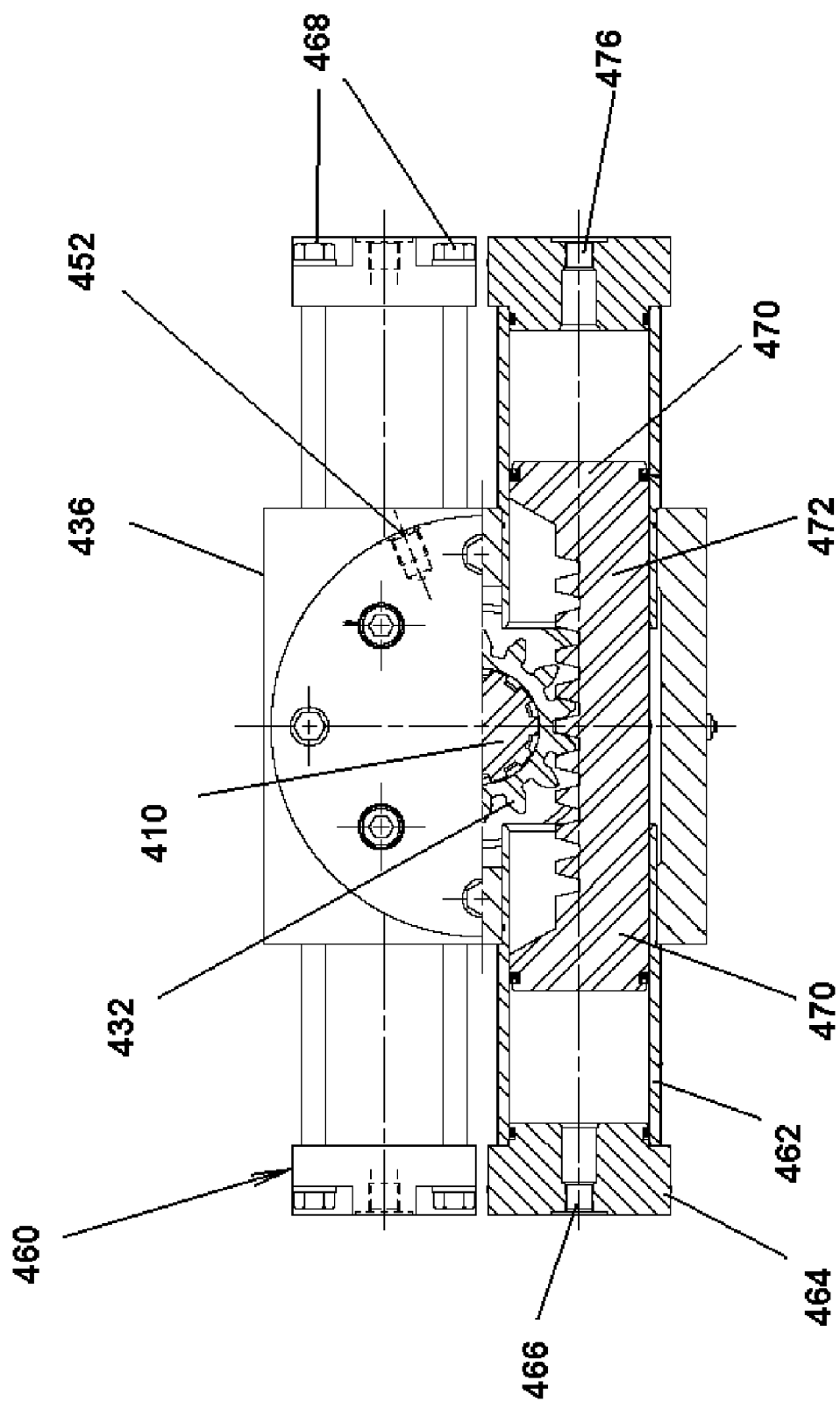
FIG. 27 is a partially section rear view of the rotary actuator of FIG. 23.

Referring to FIGS. 26 and 27, the output shaft 410 includes an externally splined center section that is telescopically supported by an internally splined support sleeve 430 having a pinion 432 integrally or separately coupled thereto. The sleeve 430 is rotatably supported at the axis 424 by tapered roller bearings 424 in an axial bore in the housing 436 of the rotary actuator 422.

The linear actuator 420 includes a cylinder assembly 440 having a cylinder sleeve 442 mounted between a base plate 444 and a face plate 446. The base plate 444 is mounted to the side frame 404 by suitable fasteners such as bolts or welding. The face plate 446 is mounted on the housing 436 by bolts 438. A piston 450 is attached to the inner end of the output shaft 410 for reciprocation in the cylinder sleeve 442. The piston 450 is pressurized in one direction at radial port 452 in the base plate 444 to extend the output shaft 410, and in the other direction at radial port 454 in the face plate 446 to retract the output shaft 410 to the illustrated position.

The rotary actuator 422 includes vertically spaced upper and lower piston assemblies 460. Each piston assembly 460 includes coaxially aligned cylinder heads 462, each having a base 464 and cylinder sleeve 466 attached to the housing by bolts 468. A piston 470 is slidably supported in the heads. The piston 470 includes axially spaced piston heads 472 centrally connected by a center rack 474 having linear teeth meshing with the pinion 432. The pistons are pressurized at ports 476 in the bases 464. The pistons of the upper and lower piston assemblies operate in phase opposition to rotate the pinion 432, without backlash and with uniform force in both clockwise and counterclockwise directions, to thereby rotate the output shaft 410 and accordingly the lower arms 414 of the tarp system at steady extension and retraction rates without startup impact acceleration.

Figure 28:
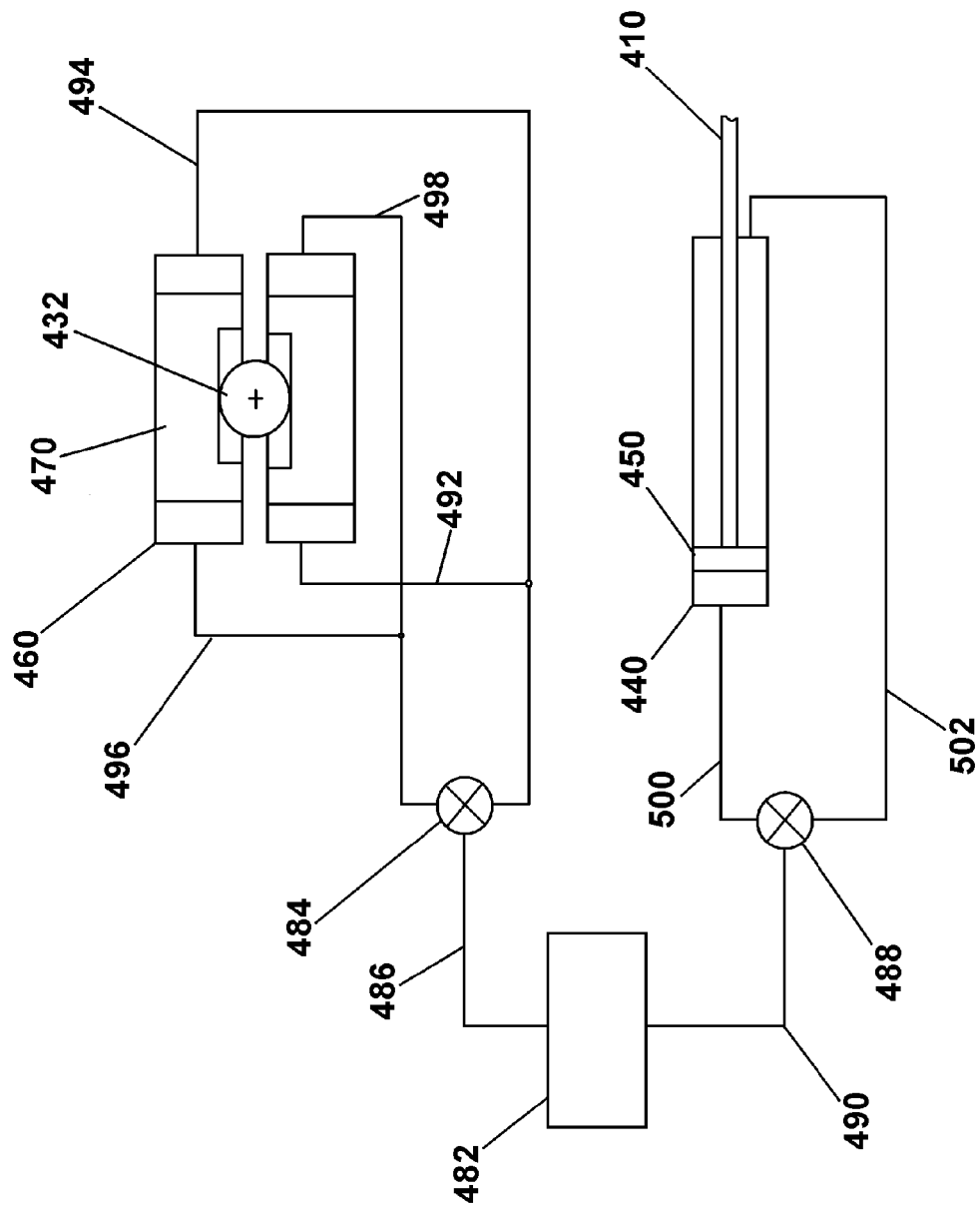
FIG. 28 is a schematic drawing of the rotary actuating system of FIG. 23.

Referring to FIG. 28, the control system 480 for the operation of the actuator system 402 includes a pressurized fluid source 482 connected to rotary actuator three-way control valve 484 by line 486, and to a linear actuator three way control valve 488 by line 490. One outlet port of the valve 484 is connected to opposite sides of the upper and lower piston assemblies 460 by lines 492, 494. The other outlet port of the valve 484 is connected to opposite sides of the upper and lower piston assemblies by lines 496, 498. One outlet port of the valve 488 is connected to one side of the piston 450 of piston assembly 440 by line 500. The other outlet port of the valve 488 is connected to the other side of the piston 450 by line 502.

In operation, to laterally shift the shaft 410 from the retracted position to the operative position, valve 488 is operated to pressurize the piston 450 through line 500. To return the shaft 410 to the retracted position, valve 488 is operated to pressurize the piston 450 through line 502. To rotate the shaft 410 in the clockwise direction, the valve 484 is operated to pressurize opposed pistons through lines 496, 498. To rotate the shaft 410 counterclockwise, the valve 484 is operated to pressurize opposed pistons through lines 492, 494. The equal piston areas in both directions provide for even acceleration and movement of the tarp arms resulting is greater operator control.

It will be appreciated that all of the foregoing embodiments of the invention provide a tarp covering system wherein arm assemblies normally stowed beneath a container and inwardly of the sides thereof may be laterally extended, pivoted in a semicircular path to deploy a tarp over the open top of a container and thereafter returned beneath the container thereby allowing the vehicle to travel between destination with an overall width determined by the container. It will be further appreciated that all of the foregoing embodiments rotate the lower arm from the cantilevered shaft of a rotary actuator located within the lateral confines of the container, feature beneficial for protecting the key components from damage, both with and without the lateral retraction capabilities.

Having thus described various preferred embodiments of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention.

The disclosures and description herein are intended to be illustrative and are not in any sense limiting of the invention, which is defined solely in accordance with the following claim.

What is claimed is:

1. A covering system for covering an open top container carried on a truck chassis, the container being characterized by a rectangular base peripherally bounded by laterally spaced vertical side walls extending laterally outward of the chassis, said covering system comprising: a pair of rotary actuators mounted on opposite sides of said chassis and extending laterally outward thereof, each rotary actuator including a housing member rotatably supporting a shaft having a pinion at an inner end, said shaft extending laterally outward from said housing member and having an outer end extending beyond the vertical side wall of the container in an operative position, a rack meshing with said pinion, first fluid motor means having output means for reciprocating said rack thereby rotating said pinion and said shaft, an arm assembly having a lower end coupled to said outer end of said shaft; a cover member having a first end transversely carried at the outer ends of the arm assemblies and a second end transversely carried at the chassis; and control means operatively coupled with said first fluid motor means for rotating said shaft from said operative position to a second position where said cover member is moved from a first position exposing said open top of the container to a second position overly said open top of said container.

2. The covering system as recited in claim 1 wherein a pair of parallel racks engage opposed portions of said pinion, and said first fluid motor means includes a first fluid motor having a first piston member operatively connected to one of said racks and a second fluid motor having a second piston member operatively connected to the other of said racks, and said control means associated with each of said first fluid motor means for operating said first and second piston members in opposed directions thereby rotating said shaft between said operative position and said second position.

3. The covering system as recited in claim 2 including telescoping means axially slidably connecting said pinion with said shaft for moving said outer end of said shaft; and wherein said control means are selectively operable with said telescoping means for moving said outer end between said operative position and a retracted position laterally inwardly of the side wall and beneath the container.

4. The covering system as recited in claim 1 wherein a pair of parallel racks engage opposed portions of said pinion, and said first fluid motor means includes a first pair of fluid motors having piston members operatively connected to opposite ends of one of said racks and a second pair of fluid motors having piston members operatively connected to opposite ends of the other of said racks, and said control means are associated with first and second pairs of said fluid motor for shifting said rack members in opposite directions thereby rotating said shaft between said operative position and a second position.

* * * * *